United States Patent [19]
Williams et al.

[11] Patent Number: 5,886,749
[45] Date of Patent: Mar. 23, 1999

[54] DEMODULATION USING A TIME DOMAIN GUARD INTERVAL WITH AN OVERLAPPED TRANSFORM

[75] Inventors: Thomas H. Williams, Longmont; Majid Chelehmal, Broomfield, both of Colo.; Yasuhiro Ito, Aoba-Ku, Japan

[73] Assignees: Cable Television Laboratories, Inc., Louisville, Colo.; Nippon Hoso Kyokai, Tokyo, Japan

[21] Appl. No.: 787,342

[22] Filed: Jan. 28, 1997

Related U.S. Application Data

[60] Provisional application No. 60/032,955 Dec. 13, 1996.

[51] Int. Cl.[6] .................................................. H04N 5/213
[52] U.S. Cl. ........................... 348/614; 348/611; 348/914
[58] Field of Search ..................................... 348/607, 614, 348/611, 914, 726; 382/280; 364/726.01, 726.02; H04N 5/21, 5/213

[56] References Cited

U.S. PATENT DOCUMENTS 5,371,548  12/1994  Williams .
5,568,202  10/1996  Koo .

OTHER PUBLICATIONS

T. Williams &M. Chelehmal, "Using Orthogonal Frequency Division Multiplexing in the Vertical Interval of an NTSC TV Transmission", National Association of Broadcasters Proceeding, 1995.

H. Sari, G. Karam, and I. Jeanclaude, "Transmission Techniques for Digital Terrestrial TV Broadcasting", IEEE Communications Magazine vol. 33, No. 2., Feb. 1995.

*Primary Examiner*—Sherrie Hsia
*Attorney, Agent, or Firm*—Stuart T. Langley; Holland & Hart LLP

[57] ABSTRACT

A system and method for demodulation of an RF signal on a transmission channel is provided. The RF signal is demodulated to baseband as an in-phase (I) data signal and a quadrature (Q) data signal. A first block of I data is captured and a first block of Q data is captured. A time domain guard interval is provided in the captured first blocks of I and Q data. A complex discrete Fourier transform is performed on the captured first I and Q data blocks. An inverse frequency response for the transmission channel is determined. The inverse frequency response is multiplied by the complex discrete Fourier transform of the guard-interval protected first I and Q data blocks to generate a frequency domain product signal. An inverse Fourier transform on the product of the multiplying step is performed to generate a first equalized time domain signal. In a preferred embodiment, the method also includes using an overlapped Fourier transform and discarding a first portion of each equalized time domain signal.

18 Claims, 12 Drawing Sheets

DEMODULATION USING A TIME DOMAIN GUARD INTERVAL WITH AN OVERLAPPED TRANSFORM

This application claims benefit of provisional application 60/032,955 filed Dec. 13, 1996.

BACKGROUND OF THE INVENTION

1. Field of the Invention.

The present invention relates, in general, to a system, method and apparatus for demodulating a transmitted signal contaminated with multi-path distortions, and, more particularly, to a system, method, and apparatus for transmitting and receiving data using a conventional quadrature amplitude modulated (QAM) or vestigial side band (VSB) modulated signal.

2. Relevant Background.

A broadcast, cable, or other communication channel through which a television signal is transmitted adds various types of distortions to the transmitted signal. One type of distortion is caused by reflections of the transmitted signal such that the received signal is composed of a directly received signal and a plurality of delayed signals that reach the receiver through several reflecting routes. The delayed signals are commonly referred to as "multi-path interference", "ghosts", or "echoes".

A typical ghost canceling circuit includes an analog-to-digital converter for converting a received signal such as a television signal (usually an analog video signal such as an NTSC, PAL, SECAM, or digital signals such as 8-VSB, 64-or 256-QAM signals, and the like) into a binary signal. The digitized signal is processed through an adaptive equalizer in the time domain or frequency domain to cancel the echoes.

There are two main steps to the ghost canceling process. First, the communication channel is characterized to determine a frequency response of the channel at the receiver. The frequency response essentially includes all of the echoes caused by the transmission channel. Once the channel characteristics are determined, filters are used to multiply the inverse of the channel frequency response characteristics with the received signal so as to cancel the ghosts. One such ghost cancellation system is described in U.S. Pat. No. 5,568,202 issued to Koo on Oct. 22, 1996.

There is increasing interest in transmission of "non-picture" data (i.e., closed-caption text or video-enhancing data), simultaneously with the picture data normally viewed on a television screen. Typically, this data is transmitted as one or more horizontal lines during the vertical blanking interval (VBI) of the television signal. There are also attempts to encode data in other non-visible portions of the television signal. While echoes caused by the communication channel are undesirable for visual data, they are often tolerable because the viewer can learn to ignore the ghosts. In contrast, echoes are intolerable in data transmission because even minor distortions raise the bit error rate (BER) of the communications channel to unusable levels. Although error correction coding can mitigate some of the errors created by echoes, this coding limits the data transmission rate and cannot practically compensate for severe echoes. A need exists for a demodulation system that cancels ghosts, and a demodulation method and apparatus with improved ability to remove ghosts.

Previous ghost cancellation systems such as described by Koo, cited above, use adaptive equalizers that are useful for correcting linear distortions affecting transmission channels. Impairments such as in-home reflections on cable wiring, broadcast echoes or ghosts, as well as diplex filter group delay and amplitude non-flatness are examples of linear impairments that can be corrected. This de-ghosting process characterizes the transmission channel by determining an impulse response of the transmission channel. A "ghost cancellation reference" (GCR) signal is placed in one line of the television signal's VBI and provides a known impulse stimulus to the transmission channel that can be detected at the receiver. The impulse response is used to calculate tap coefficients for a finite impulse response filter (FIR) or infinite impulses response filter (IIR) used in the adaptive equalizer.

These systems work well for relatively short duration echoes. The FIR circuits have a limited number of taps for cost and size reasons, and hence are effective only for canceling echoes of relatively short delay. These systems can only remove echoes when the energy from the main or direct path signal and the energy from all of the echoes from the main signal are contained within the same block (i.e., can be processed simultaneously by the FIR filter). Any echo energy that is not contained within the block cannot be canceled by a FIR filter, so an IIR filter must be used. The quality of the solution is strongly deteriorated if there are an insufficient number of taps relative to the delay and strength of the echo. If the echo is long and strong, the solution is poor. On the other hand, IIR filters cannot guarantee stability and so may cause undesirable oscillation and generally cannot be made to have a linear phase response.

The impulse response may be transformed into the frequency domain where the echo appears as a ripple in the frequency response. The reciprocal of the delay of the echo is the period of the frequency response ripple, and the amplitude of the echo is represented by the amplitude of the frequency response ripple. This dual view of the channel's appearance with an echo is possible because of the discrete Fourier transform (DFT) operation used to transform a signal between the time domain and the frequency domain.

In one data transmission technology called "orthogonal frequency division multiplexing" (OFDM) a "guard interval" can be used to overcome the effect of echoes shorter than the guard interval. In OFDM, a digital signal (such as a television signal) is transformed using an inverse discrete Fourier transform (IDFT) before it is applied to the transmission channel. At the receiver, the signal is transformed by a forward DFT to recover the transmitted signal. A guard interval is inserted before each block of the IDFT signal before transmission. The guard interval usually consists of a cyclic extension of the IDFT output blocks. Provided that the guard interval length (i.e., time duration) is larger than echoes in the channel's impulse response, the cyclic prefix makes the linear convolution of the channel appear as a circular convolution that can be more accurately transformed by the discrete Fourier transform process at the receiver. An example of guard-interval protected OFDM data encoded into a conventional television signal is shown in U.S. Pat. No. 5,371,548 issued to Williams on Dec. 6, 1994 and assigned to the Assignee of the present invention. The guard interval technique has not been applied to conventional vestigial side band (VSB) transmissions such as 8-VSB and National Television Standards Committee (NTSC) signals or to QAM signals such as 64-QAM.

SUMMARY OF THE INVENTION

Briefly stated, the present invention involves a method for signal demodulation of an radio frequency (RF) signal on a transmission channel. The RF signal includes a time domain data signal modulated on an RF carrier. A time domain guard interval is provided on the transmitted signal. The RF signal is demodulated to baseband as an in-phase (I) data signal and a quadrature (Q) data signal. A first block of I data is captured and a first block of Q data is captured. A complex DFT is performed on the captured first I and Q data blocks. An inverse frequency response for the transmission channel is calculated. The inverse frequency response is multiplied by the complex DFT of the guard interval protected first I and Q data blocks to generate a frequency domain product signal. An IDFT is performed on the product of the multiplying step to generate a first equalized time domain signal. In a preferred embodiment, the method also includes using an overlapped Fourier transform and discarding a first portion of each demodulated time domain signal.

Optionally, the captured first blocks correspond to two sequential lines of an NTSC signal and the time domain guard interval is provided by selecting the first blocks such that the first block begins immediately after a horizontal blanking interval of the first line and the first block ends immediately after a horizontal blanking interval of the second line.

DETAILED DESCRIPTION OF THE PREFERRED EMBODIMENTS

Adaptive equalizers typically use finite impulse response (FIR) filters 106 to correct linear distortions affecting transmission channels. Impairments such as in-home reflections on cable wiring, broadcast echoes or ghosts, and diplex filter group delay and amplitude non-flatness are examples of linear impairments that can be corrected by adaptive equalizers. The present invention is illustrated herein using an analog NTSC signal, however, it should be understood that the present invention can be applied to any digital data transmission and is particularly applicable to QAM and VSB digital signals.

Figure 1:
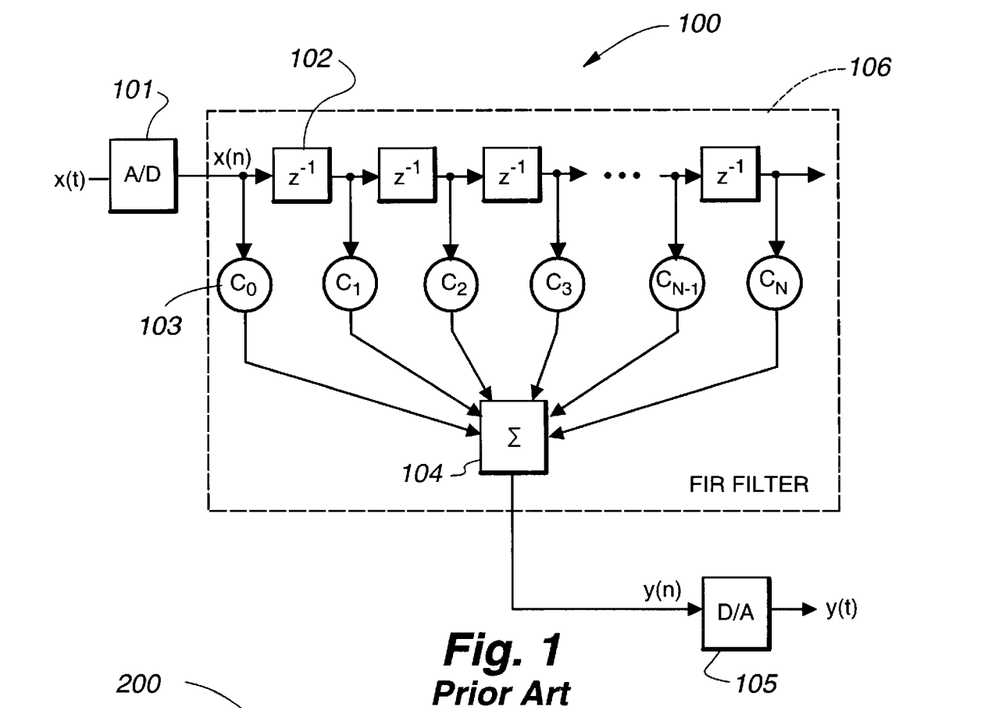
FIG. 1 illustrates in block diagram form a real coefficients adaptive equalizer used in prior art ghost cancellation systems.

FIG. 1 is a block diagram of a prior art real-only adaptive equalizer 100. Equalizer 100 comprises an analog-to-digital converter (ADC) 101, time delay elements 102 labeled $z^{-1}$, programmable multipliers 103, a summing circuit 104, and a digital-to-analog converter (DAC) 105. The equalizer filter performs the convolution function:

$$y(n) = \sum_{k=0}^{N} C(k)x(n-k) \quad (1)$$

Where C(k) is a tap coefficient for multipliers 103, k is the tap number, N+1 is the number of taps, n is the time sample index, x(n) and y(n) are the input and output time samples respectively, normalized for a sample period of 1.0. This equalizer structure can be used for correcting leading and trailing echoes with appropriate placement of the center tap.

Figure 2:
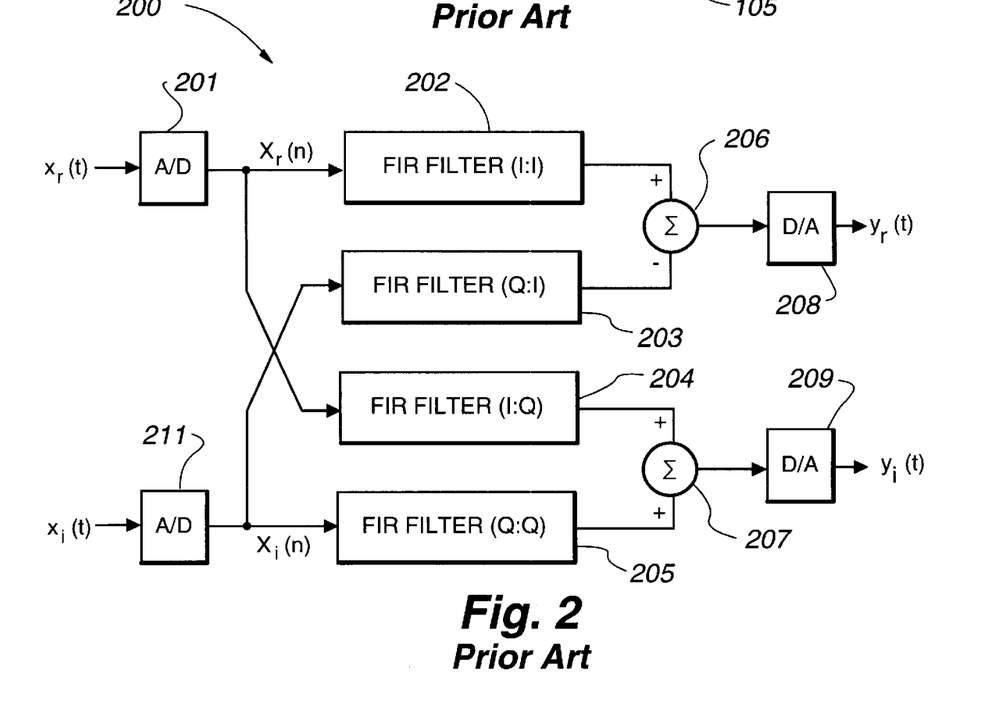
FIG. 2 illustrates in block diagram form a complex coefficients adaptive equalizer used in prior art ghost cancellation systems.

Equalizer 100 shown in FIG. 1 has real-only tap coefficients. If the echo is complex, an equalizer, such as adaptive equalizer 200 shown in FIG. 2, with complex taps is required. Complex echoes occur when an impairment is added to a radio frequency (RF) or intermediate frequency (IF) signal. A complex equalizer structure consists of a real section 202, an imaginary section 205, a real-to-imaginary section 204 and imaginary-to-real section 203 cross-coupled as shown in FIG. 2.

Complex equalizer 200 comprises a first ADC 201 receiving an in-phase (i.e., real) portion of a baseband signal. The digital output of ADC 201 is coupled to real-to-real FIR filter 202. The output of ADC 201 is also coupled to real-to-imaginary FIR filter 204. Second ADC 211 receives the quadrature (i.e., imaginary) portion of the input signal. The output of ADC 211 is coupled to imaginary-to-real FIR filter 203 and imaginary-to-imaginary FIR filter 205. Each of the outputs of FIR filters 202, 203, 204 and 205 include multiple tap outputs as illustrated in FIG. 1.

The output of FIR filters 202 and 203 are coupled to subtractor 206. The output of subtractor 206 is coupled to digital-to-analog converter (DAC) 208. The output of DAC 208 provides the ghost canceled in-phase signal. The output of FIR filter 204 and FIR filter 205 are coupled to summing adder circuit 207. Summing circuit 207 provides the summed output to DAC 209 which provides an analog quadrature signal for further processing.

The complex equalizer structure 200 performs the functions:

$$y_r(n) = \sum_{k=0}^{N} C_r(k)x_r(n-k) - C_i(k)x_i(n-k) \quad (2)$$

For the real output voltage, and:

$$y_i(n) = \sum_{k=0}^{N} C_r(k)x_i(n-k) + C_i(k)x_r(n-k) \quad (3)$$

for the imaginary output voltage where $y_r(n)$ and $y_i(n)$ are the in-phase and quadrature output voltages, respectively. In Equation 2 and Equation 3, $C_i$ and $C_r$ are real and imaginary tap coefficients used in FIR filters 202, 203, 204, and 205. The coefficients $C_i$ are used in the FIR filter for blocks 203 and 204 while the coefficients $C_r$ are used in the FIR filter for blocks 202 and 205. In these equations, $x_r(n)$ and $x_i(n)$ are the in-phase and quadrature sample voltages for input to equalizer 200, respectively.

Figure 3:
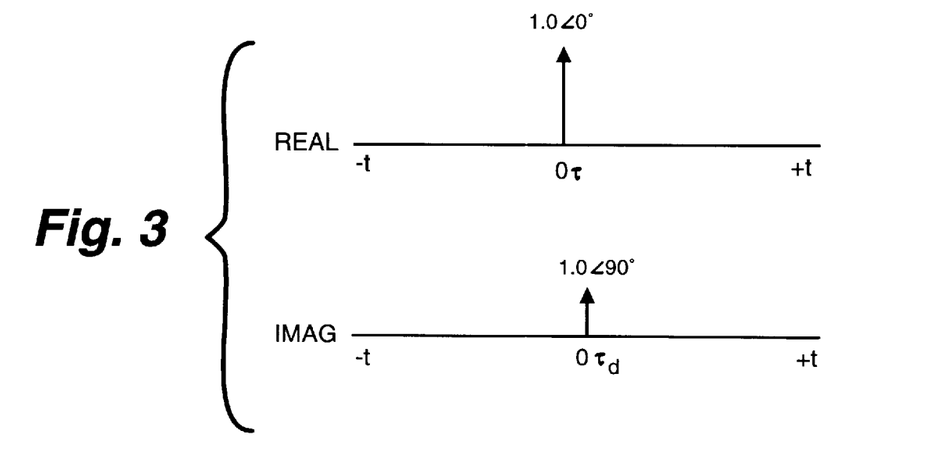
FIG. 3 shows a complex impulse response with an echo in the time domain.
Figure 4:
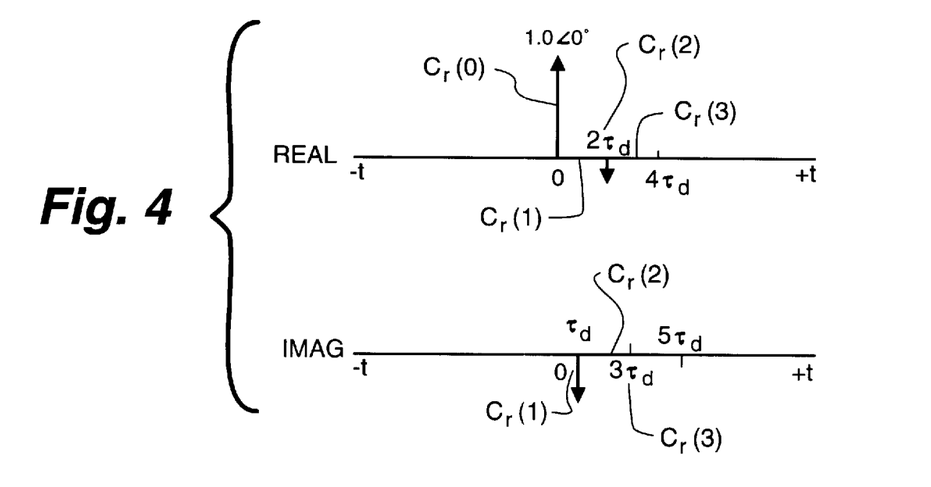
FIG. 4 illustrates complex tap coefficients used to cancel the echo of FIG. 3 using a complex adaptive equalizer shown in FIG. 2.

A deghosting process in accordance with one aspect of the present invention is illustrated in FIG. 3–FIG. 6. FIG. 3 illustrates a time domain diagram of an impulse response of a complex echo that has a delay of $\tau_d$ and an amplitude of 0.5 relative to the main impulse at 90 degrees relative to the original direct-path signal. The term "main impulse" is alternatively referred to as the "direct-path impulse" and represents the portion of the received signal that is desired to be received at the receiver.

After the transmission channel is accurately characterized at a receiver and the coefficients are programmed into FIR filters 202–205, the tap coefficients would appear as shown in Table 1.

TABLE

| n | $C_r$ (n) | $C_i$ (n) |
|---|---|---|
| 0 | 1 | 0 |
| 1 | 0 | −0.5 |
| 2 | −0.25 | 0 |
| 3 | 0 | 0.125 |
| 4 | 0.625 | 0 |
| 5 | 0 | −0.0312 |

It should be noted that the first tap coefficient $C_i(1)$ occurs at a delay of $\tau_d$ with an amplitude of 0.5. Thereafter, tap coefficients reappear every $\tau_d$ units of delay with amplitudes of $0.5^n$ where n is the number of echo recursions. The tap coefficient phase rotates 90 degrees on every recursion in the particular example shown in FIG. 3–FIG. 6.

Figure 5:
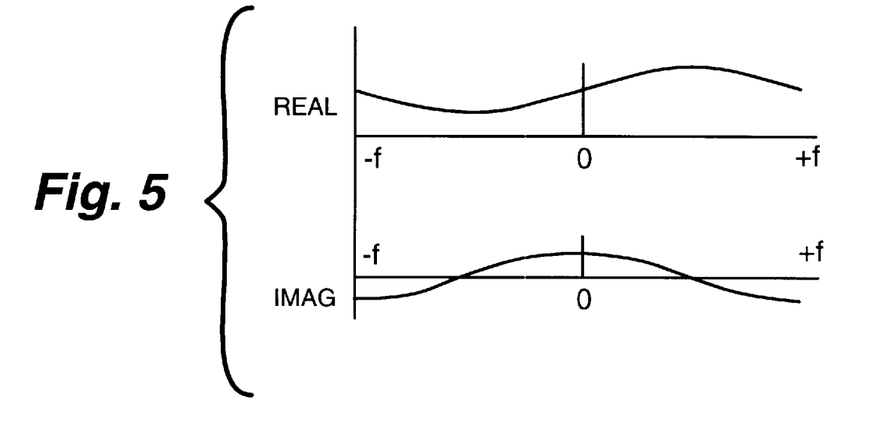
FIG. 5 shows a complex impulse of FIG. 3 in the frequency domain.

FIG. 5 shows the frequency domain response of the impulse response shown in FIG. 3. In FIG. 5, the horizontal axis represents frequency with zero being the center frequency for the transmitted channel, and the vertical axis represents signal magnitude in the frequency domain of the real and imaginary parts. The echo occurring at $\tau_d$ produces a ripple in the frequency response. The reciprocal of the delay of the echo (i.e., $1/\tau_d$) appears as the period of the frequency response ripple. The amplitude of the echo appears as the amplitude of the ripple in the frequency response. If this frequency response data is divided using complex division into the transformed received data at every frequency point, the result is the corrected frequency response data. The deghosting function is accomplished by transforming the corrected frequency response data using an IDFT back into the time domain.

In other words, if the transmitted signal is denoted as s(t), and it is received with an echo of magnitude a and delay $\tau_d$ added, the resulting received signal r(t) is:

$$r(t) = s(t) + a \cdot s(t - \tau_d) \quad (4)$$

By transforming the received signal r(t) using a Fourier transform into the frequency domain it becomes R(f):

$$R(f) = S(f)(1 + ae^{-j2\pi f \tau_d}) = S(f)H(f) \quad (5)$$

Where H(f) is the transmission channel's frequency response. The transmission channel's inverse frequency response is computed as the reciprocal of the transmission channel's frequency response:

$$H^{-1}(f) = \frac{1}{H(f)} \quad (6)$$

In the frequency domain, the echo-corrected received signal S(f) can be obtained by multiplying the received signal by the channel's inverse frequency response:

$$S(f) = R(f)H^{-1}(f) \quad (8)$$

S(f) can be transformed back to time domain signal s(t) to obtain the original transmitted signal without echo impairments using an inverse Fourier transform.

Figure 6:
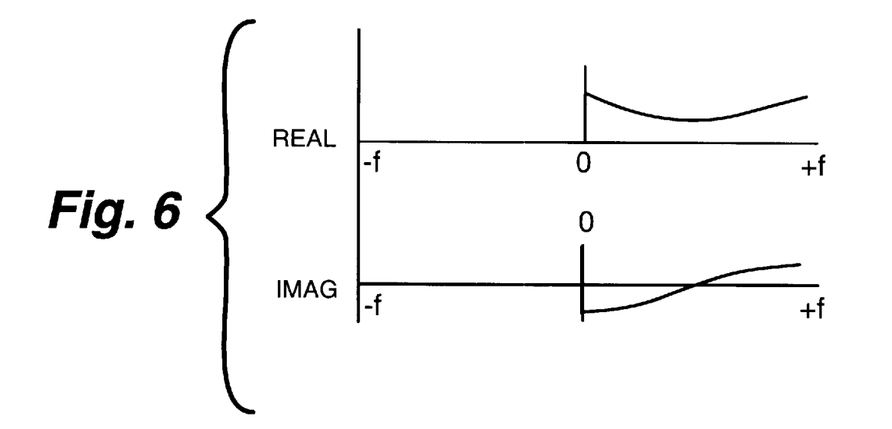
FIG. 6 shows a complex frequency domain filter response that does echo cancellation and frequency domain vestigial side band filtering.

As illustrated in FIG. 6, there also is an opportunity while the signal is transformed in the frequency domain to easily do band filtering in addition to the echo cancellation discussed above. A vestigial side band (VSB) response that is required for NTSC receivers, for example, can be generated by setting the lower side band coefficients to all zeros. This technique is discussed in an article titled "Using Orthogonal Frequency Division Multiplexing In The Vertical Interval Of An NTSC TV Transmission" by M. Chelehmal and T. Williams published in the 1995 National Association of Broadcast Proceedings. For digital signals such as 8-VSB, the frequency response between the upper and lower sidebands is not abrupt but is shaped as a root cosine function.

One limitation of frequency domain equalization as described above is the Fourier transform operates on one block of data at a time. For exact echo correction, it is necessary that no extraneous energy be included in any block transform. Every direct-path signal that is in the transform must have its expected echo occur within the transform and every echo must be accompanied by the signal that generated it. As used herein, the term "expected echo" means a signal that can be anticipated at the receiver given the impulse response of the channel and the transmitted signal.

In accordance with the present invention, at least one time domain guard interval is included in the time domain signal before it is transmitted. In a particular example, the time domain guard interval is provided by taking a sample of data from the end of a block of digitized time domain data and appending the sample of data to a period of time just before the start of the block.

Figure 7:
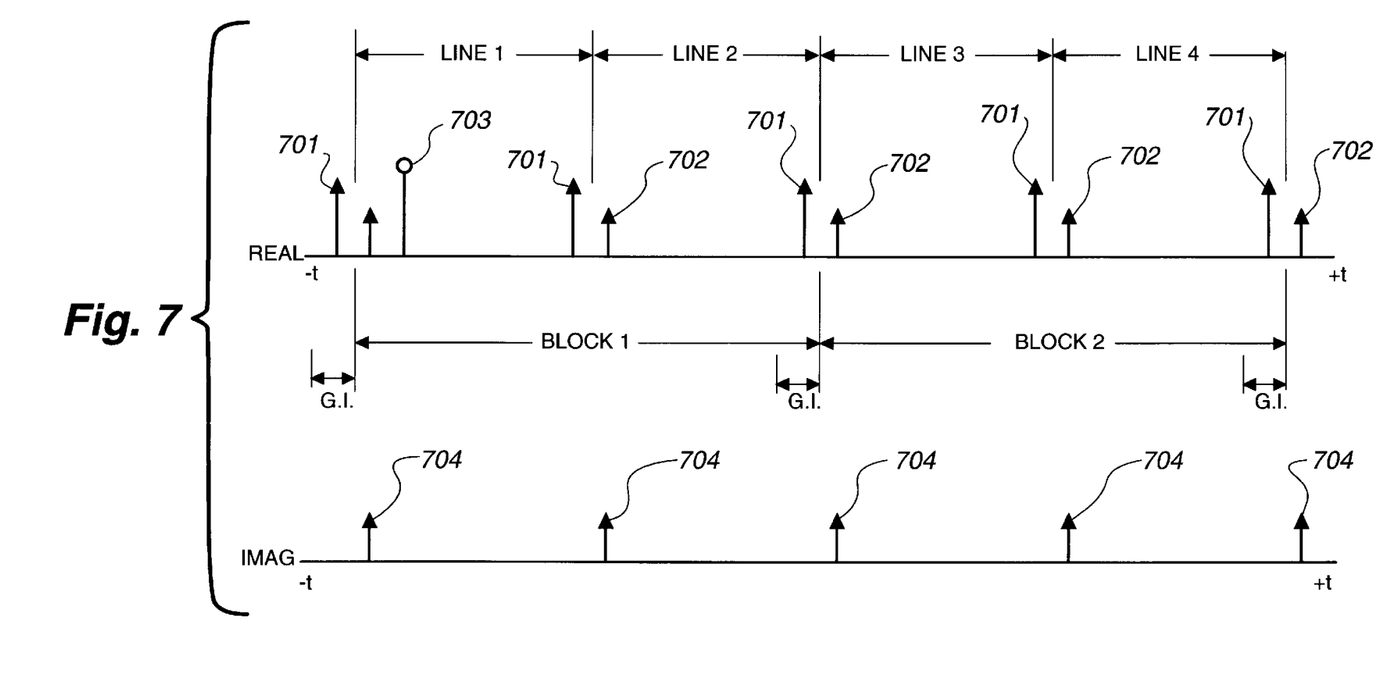
FIG. 7 shows a time domain diagram of a complex signal with a single complex echo suitable for filtering using the systems and methods in accordance with the present invention.

FIG. 7 illustrates a capture interval for two blocks of data of a recurring or cyclical signal. An example of a cyclical signal is a typical television transmission where each line has a predefined data format and includes a horizontal blanking interval. In NTSC, every other transmitted horizontal blanking interval is substantially identical. As shown in FIG. 7, Block 1 comprises two lines, (i.e., line 1 and line 2). In Block 2, line 3 and line 4 are included. The line numbers indicated in the illustrations herein are for ease of reference only and do not represent line numbers in a formatted television signal such as an NTSC signal. In an NTSC signal, for example, each field or scan comprises all even lines or all odd lines in a subsequent scan such that line 1 and line 2 are separated by an entire field in the time domain signal. In the Figures, line 1 is adjacent to line 2 which is adjacent to line 3, etc., in the time domain signal. The selection of particular block size or length is a matter of design choice if the copy-and-append method for providing a guard interval is used. In other words, the guard interval technique can be applied to any block size. A longer guard interval provides increased immunity to longer echoes.

The guard interval allows echoes shorter than the guard interval to die out before the block is captured. When a guard interval is used and the expected echo is shorter than the guard interval, the effect of the echo can be removed completely in a noise-free environment if the echo does not cancel completely the main signal. The echo must be shorter than the guard interval or some of the echo energy will extend out of the guard interval and will contaminate the Fourier transform process.

In FIG. 7, the received signal is illustrated with real and imaginary components. A guard interval works by creating a cyclic signal. The echo created by the guard interval is identical to the echo created by the signal that is the source for the guard interval. Any non-cyclic energy dies out during the guard interval. Each direct path impulse 701 is accompanied by an expected echo with real part 702 and imaginary part 704. The delay between direct path impulse 701 and expected echo 702 and 704 is less than the guard interval indicated by G.I. in FIG. 7.

If the portion of the waveform indicated as Block 1 were processed by itself (i.e., without the guard interval) through a Fourier transform, there is an imbalance between the number of direct-path impulses 701 and echo impulses 702 and 704 that would be captured within Block 1. By copying the guard interval from the back end of Block 1 to the front end of Block 1 before transmission, the balance is restored and the transform includes echo energy from impulse 702 for every impulse 701 that is processed. Alien echo 703 represents a long echo occurring in line 1 and will be discussed in greater detail hereinafter.

Figure 8:
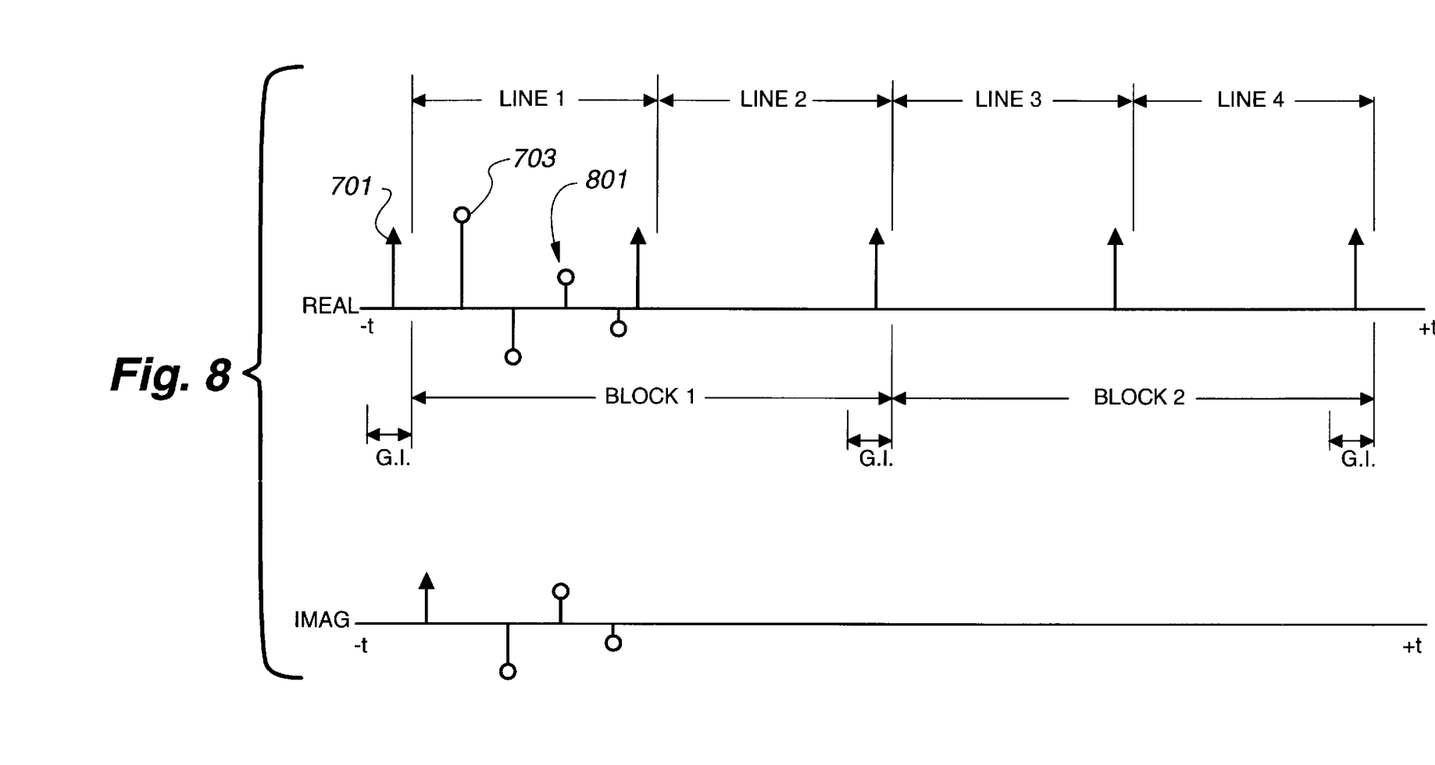
FIG. 8 shows a time domain diagram of the signal in FIG. 7 after deghosting.

FIG. 8 illustrates the signal shown in FIG. 7 after guard interval deghosting in accordance with the present invention. It can be seen that all expected echoes 702 and 704 have been removed from the signal. However, it can be seen that alien echo 703 results in multiple impulses 801 in both the real and imaginary signal portions. The multiple echoes 801 result because alien 703 has an echo cancellation process applied to it, which created echoes rather than canceling them. Alien 703 has resulted, for example, from a previous direct path impulse (not shown) or from some other signal distortion in the transmission channel. Block 1 captures alien impulse 703 but has not captured the direct path signal that created it, assuming it is a long echo. Hence, the Fourier transform acts to generate multiple echoes 801 for all alien echoes 703 that have a duration longer than the guard interval chosen. For practical reasons, the guard interval duration must be limited to account for worse case expected normal echoes, however, it is also important to cancel unexpectedly long echoes such as alien 703.

Figure 9:
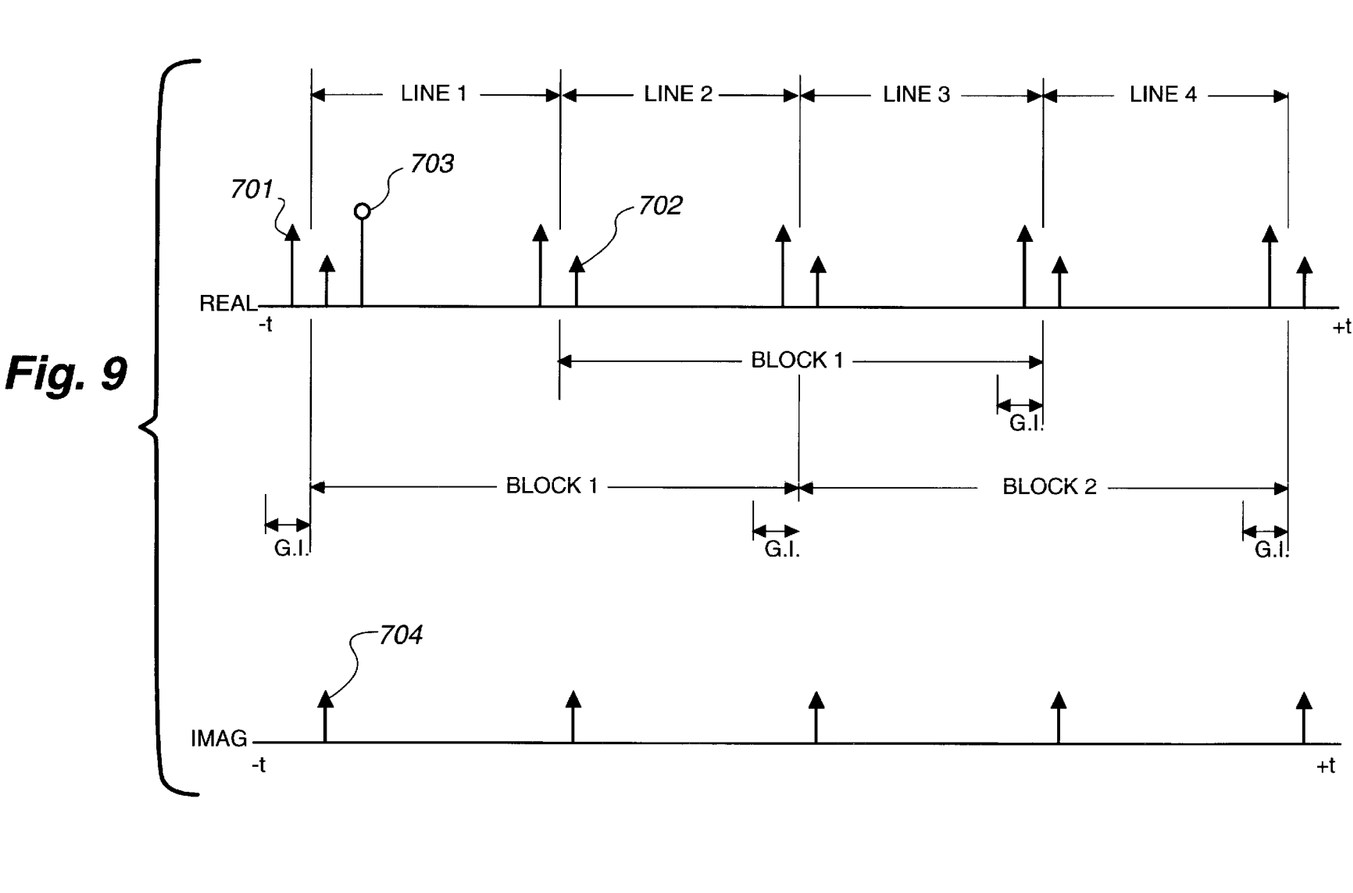
FIG. 9 shows a time domain diagram illustrating an overlapped transform technique in accordance with the present invention.

In another aspect of the present invention, an overlapped transform technique is used to diminish alien echoes 703 that occur after the guard interval used in accordance with the first embodiment. FIG. 9 illustrates the signal of FIG. 7 using an overlapped transform technique in accordance with the present invention. Comparing FIG. 7 and FIG. 9, it can be seen that the overlapped transform is accomplished by judicious selection of the portion of the signal that goes into each block. Each block of data includes one-half of the data in the previous block and one-half of the data in the subsequent block. Preferably, each block in the overlapping blocks includes a guard interval described hereinbefore. As shown in FIG. 9, Block 1 includes lines 1 and 2, Block 2 includes lines 2 and 3, and Block 3 includes lines 3 and 4 plus a guard interval. Each block is processed through the Fourier transform described hereinbefore and VSB filtered if desired.

Figure 10:
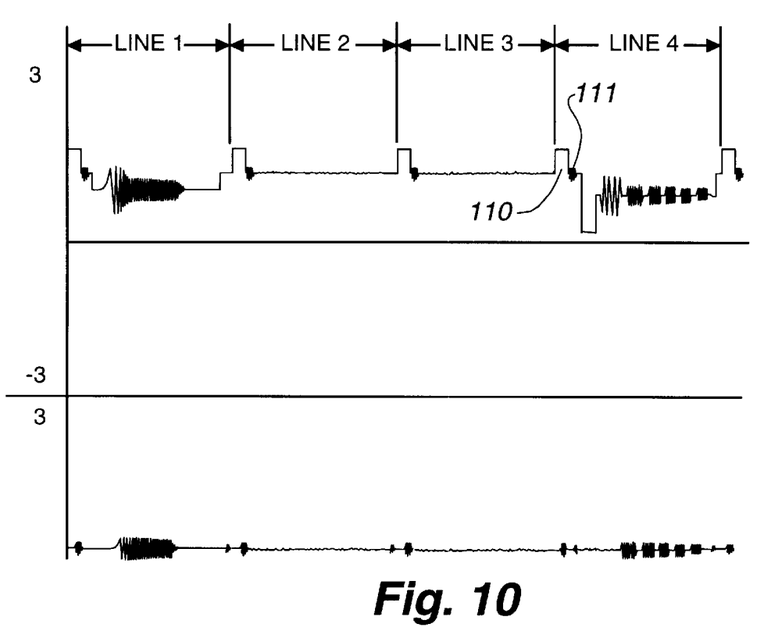
FIG. 10 shows a time domain diagram of an unimpaired National Television Standards Committee (NTSC) VBI television signal.

The present invention has particular application to signals that contain substantially identical portions that repeat cyclically, such as a National Television Standards Committee (NTSC) television signal. FIG. 10 shows a time domain diagram including several lines of an unimpaired NTSC television signal. The NTSC television standard sets a frame rate (i.e., the rate at which the entire screen is refreshed) of 29.97 Hz. Each frame includes two fields or scans—the first scan includes only the odd lines and the second scan includes only the even lines. Between the fields is a period of time called the vertical blanking interval (VBI) used to reposition the beam from the bottom of the screen at the end of the first scan to the top of the screen before the second scan begins.

A conventional NTSC signal has 525 vertical lines such as Line 1, Line 2, Line 3, and Line 4 shown in FIG. 10. The first scan includes lines 1–247 followed by the VBI in lines 248–263. The second scan includes lines 264–510 followed by the VBI in lines 511–525. The information is provided one line at a time from left to right at 15,734 Hz (i.e., 63.6 microseconds per line). After each line is scanned, the beam returns back to the left and the signal is blanked during a horizontal blanking interval 110 shown in FIG. 10. Typically the horizontal blanking interval consumes about 10.4 microseconds of the 63.6 microsecond allocated per line.

For color signals, a phase synchronization signal or color burst 111 is inserted into the "back porch" of each horizontal blanking interval. The color burst signal comprises 8–9 cycles at the color sub-carrier frequency (i.e., 3.58 MHz). One feature of the NTSC signal is that the color burst 111 in every other line is substantially identical. As described in greater detail hereinafter, the present invention takes advantage of the cyclic nature of color burst 111 in an NTSC television signal to provide a guard interval without changing the format or consuming additional valuable bandwidth in the signal.

Figure 11:
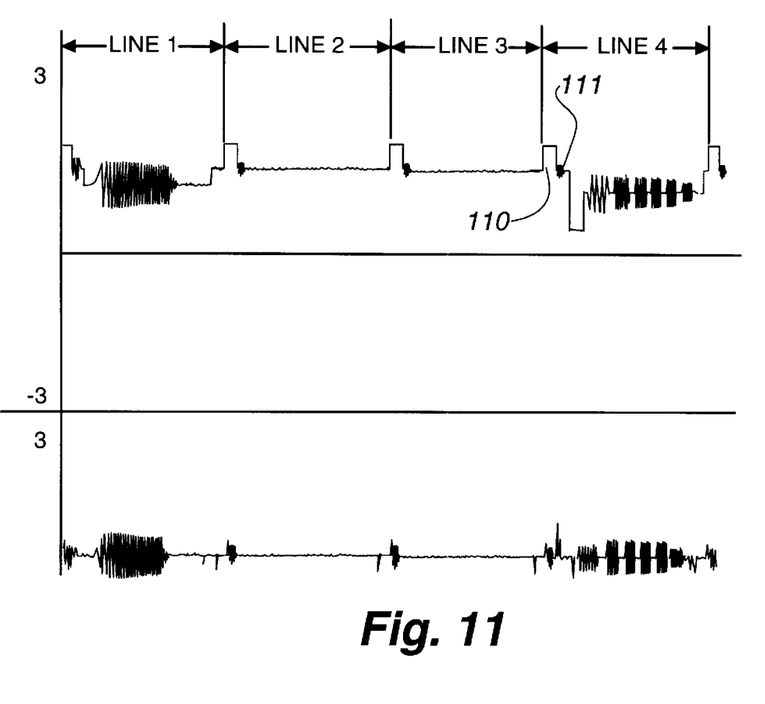
FIG. 11 shows the signal of FIG. 10 after frequency domain VSB filtering.

FIG. 11 shows the signal of FIG. 10 after frequency domain VSB filtering. VSB filtering is optional in accordance with the present invention but can be readily accomplished in the frequency domain. The simulations shown in FIG. 12–FIG. 16 are based on the VSB filtered signal and so FIG. 11 is provided as a reference for the simulations.

Figure 12:
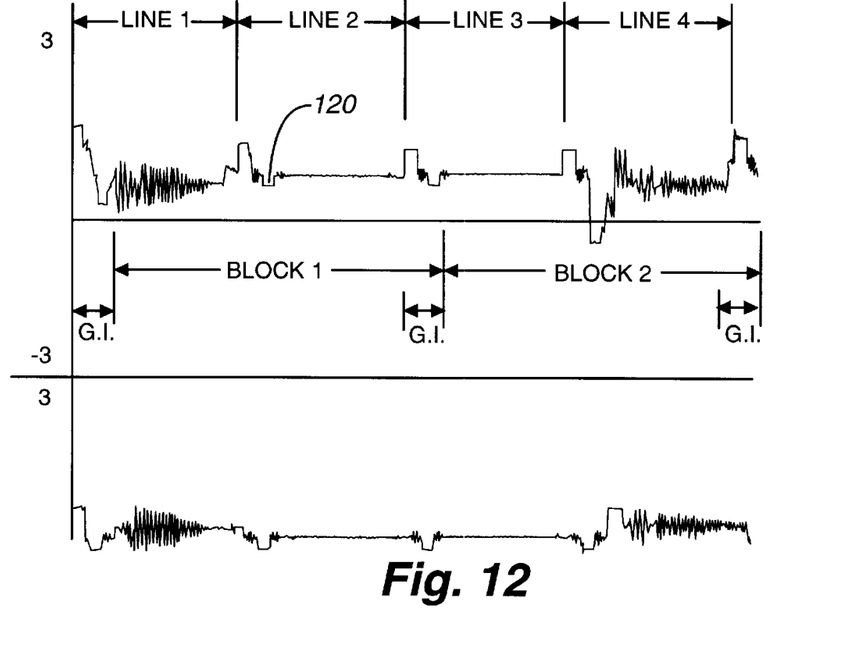
FIG. 12 shows the signal of FIG. 10 with a relatively short duration echo.

FIG. 12 shows the signal of FIG. 11 with a relatively short duration echo 120. The simulation was performed with a 9 microsecond echo at −3 dB with a phase of 250° relative to the direct path signal. Echo 120 is shorter in duration than the guard interval made up of the 10.4 microsecond horizontal blanking interval 110 (shown in FIG. 10).

Every other horizontal blanking interval 110 is substantially identical, as described above. In accordance with the present invention, the signal shown in FIG. 12 is captured as blocks of in-phase (I) data and quadrature (Q)data. Each block is selected to include 2 lines. In accordance with the present invention, the data blocks begin at the end of the horizontal blanking interval and end just before the horizontal blanking interval of the second next line. Hence, the data from the back end of each block is inherently the same as the data at the beginning of the block, and the guard interval is automatically provided. This feature eliminates the need for copying the back end of each block and appending the copied portion to the beginning of each block. Although the NTSC standard has existed for many years, an important feature of the present invention is the discovery and utilization of this portion of the signal as a guard interval. However, use of this inherent guard interval is limited to the 10.4 microsecond interval provided by the NTSC standard horizontal blanking interval. If a longer guard interval is necessary, it is possible by making the data just before the horizontal blanking interval the same, or alternatively a flat line. Likewise, for non-NTSC television signals this technique works equally well where guard intervals can be found in repeating signal patterns. In each case, however, the guard interval can be provided by including a cyclically repeating substantially identical portion of appropriate duration in the transmitted television signal. A generic implementation of the present invention including non-NTSC signals is described in greater detail below in reference to FIG. 19.

Figure 13:
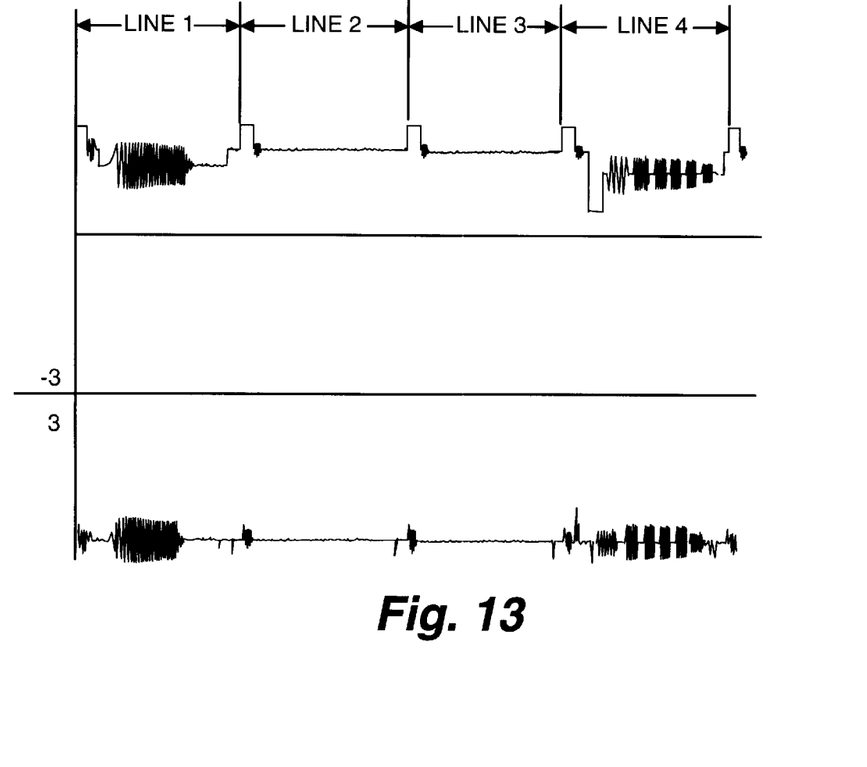
FIG. 13 shows the signal of FIG. 12 after frequency domain filtering with a guard interval in accordance with the present invention.

FIG. 13 shows the signal of FIG. 12 after frequency domain filtering with a guard interval in accordance with the present invention. It can be seen by comparison of FIG. 13 with FIG. 11 that the short duration echo is eliminated and the resulting waveform is substantially unimpaired.

Figure 14:
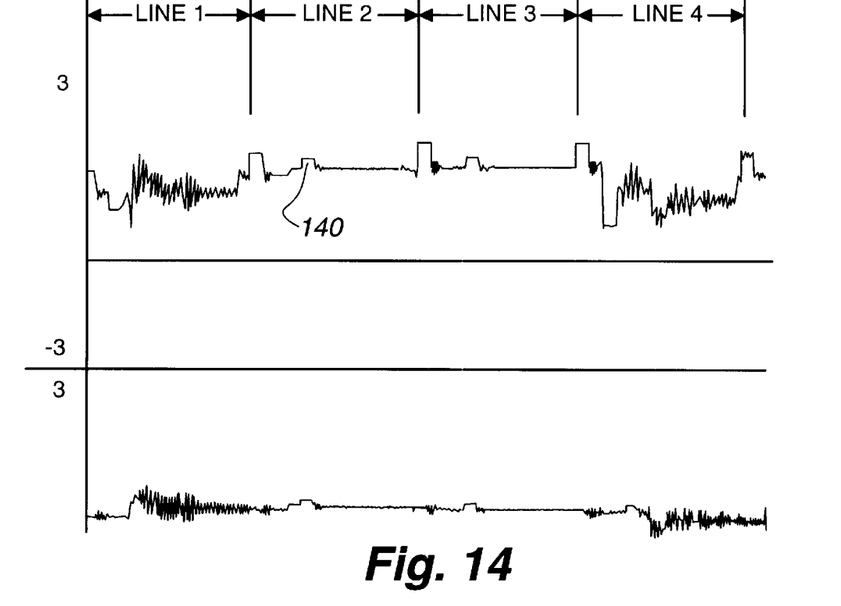
FIG. 14 shows the signal of FIG. 10 with an echo that is longer in duration than the guard interval.
Figure 15:
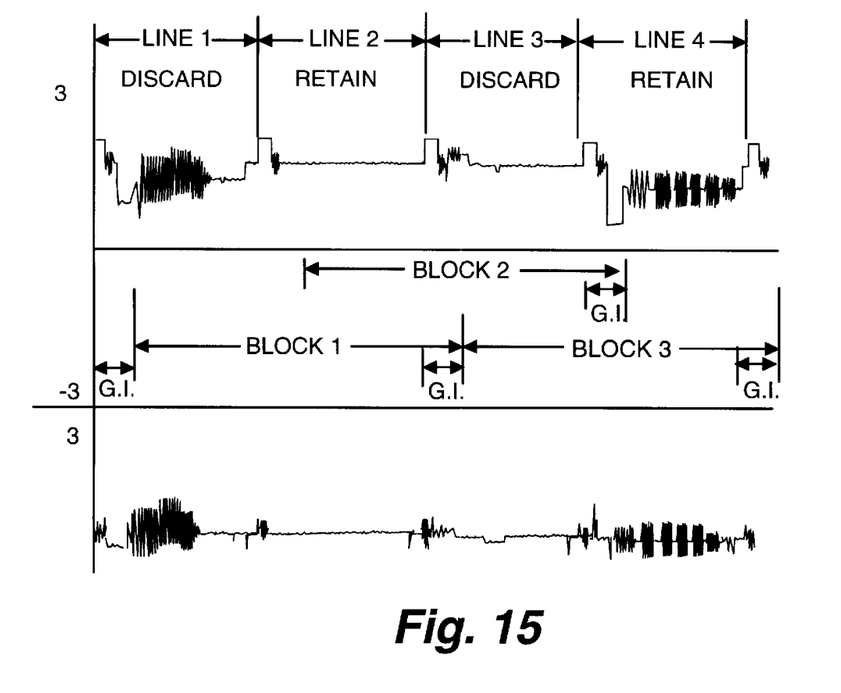
FIG. 15 shows the signal of FIG. 14 after an overlapped transform process in accordance with one embodiment of the present invention.
Figure 16:
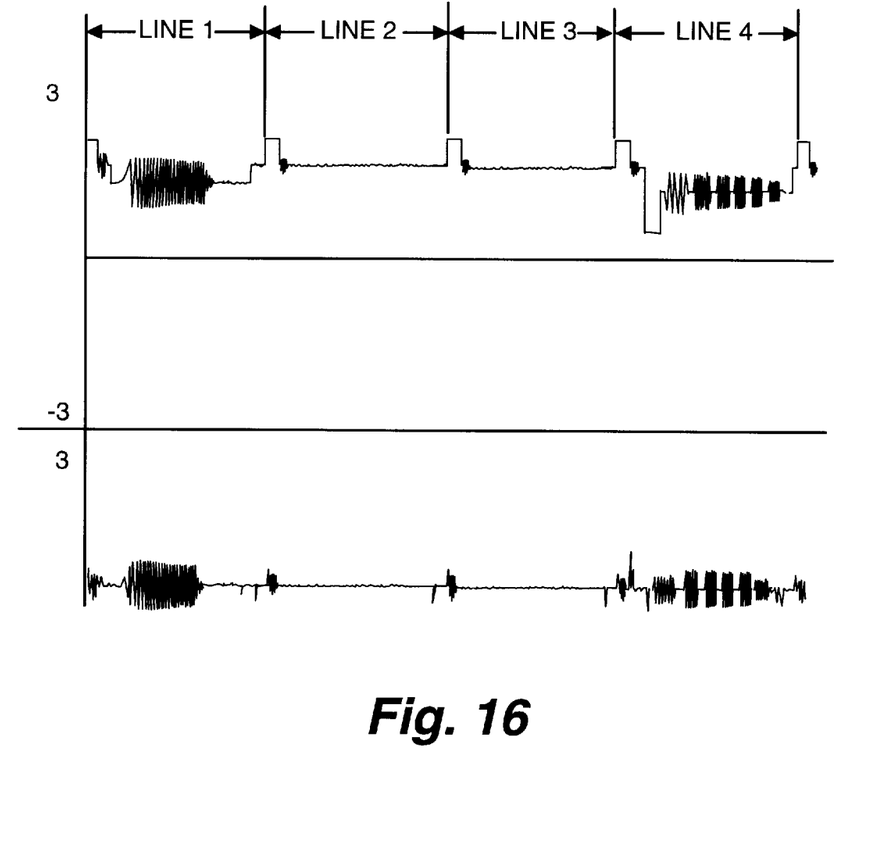
FIG. 16 shows the signal of FIG. 15 after discarding selected portions in accordance with the present invention.

FIG. 14 shows the signal of FIG. 11 with an alien echo 140 that is longer in duration than the guard interval. As set out hereinbefore, echoes 140 that are longer than the guard interval cannot be canceled by the guard interval technique. In accordance with overlapped transform feature of the present invention, the contents of each block are selected as shown in FIG. 15 to include overlapping lines. FIG. 15 shows the signal of FIG. 14 after an overlapped transform process in accordance with the present invention. Using the overlapped transform method, each line is essentially processed two times. The first time it is in the front half or discarded portion of the resultant signal such as line 1 and line 3 in FIG. 15. The second time it appears in the back half or retained portion of the resultant signal such as line 2 and line 4 in FIG. 15. The retained portions (i.e., line 2 and line 4 in FIG. 14) are subsequently combined to generate the output signal shown in FIG. 16.

In an alternative embodiment, the overlapped transform is only performed when a long echo exists in the captured block. The presence of a long echo can be determined from the channel's impulse response. By performing the step of discarding the first portion only when it is determined that an echo is present that is long than the guard interval, considerable processing power and delay can be avoided.

Figure 17:
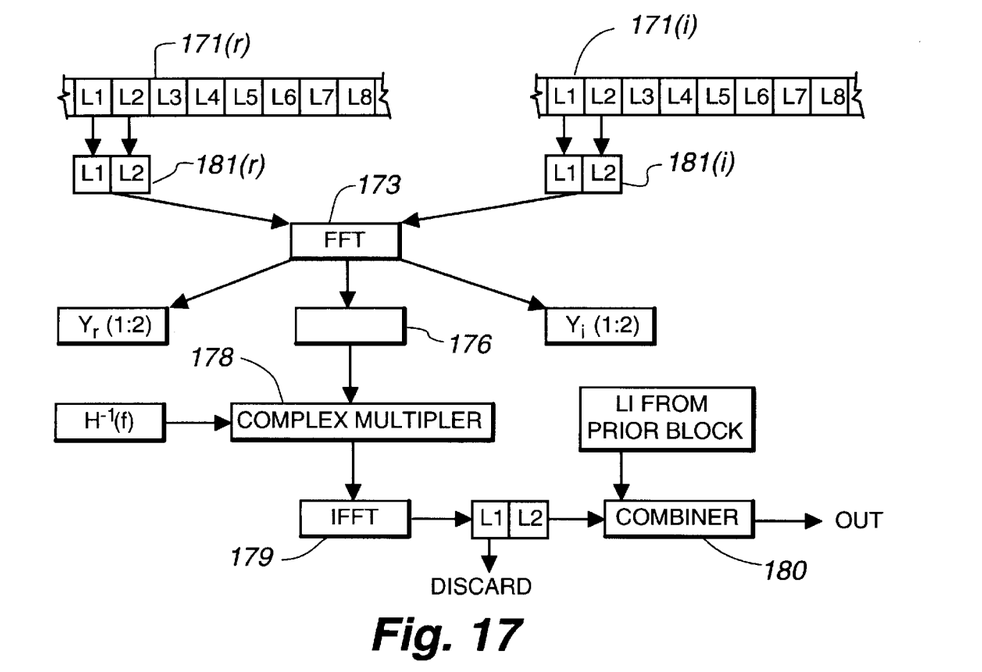
FIG. 17 and FIG. 18 show block flow charts of a method of deghosting in accordance with the present invention.
Figure 18:
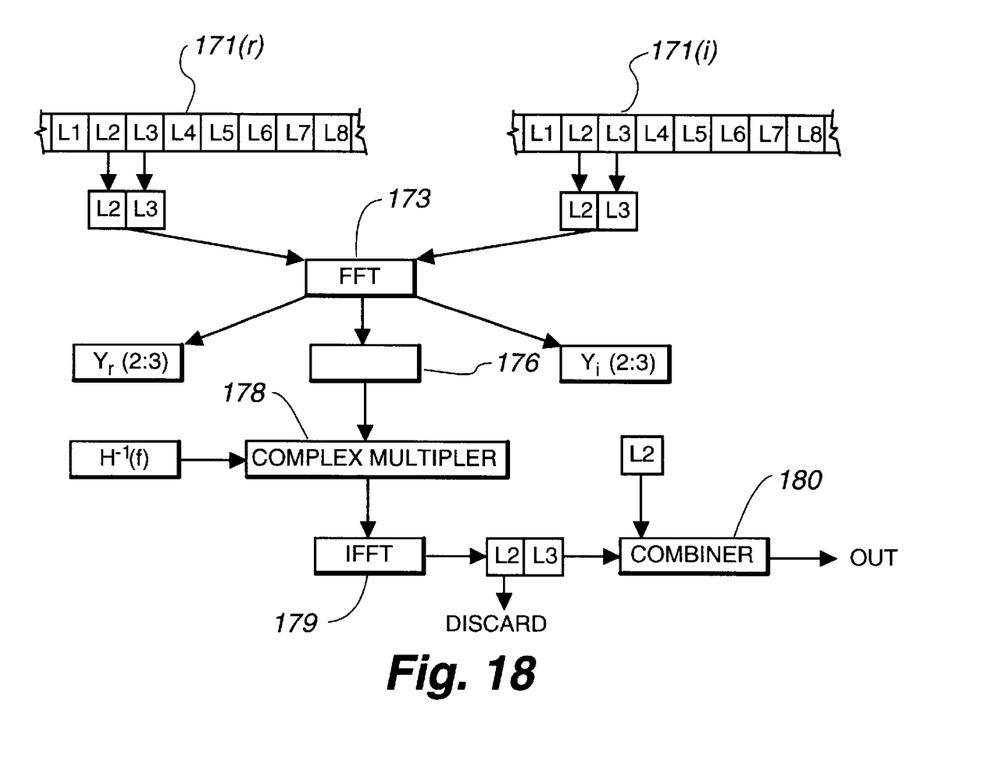

FIG. 17 and FIG. 18 are flow diagrams illustrating significant steps in the demodulation process in accordance with the present invention including the overlapped transform technique. The process shown in FIG. 17 and FIG. 18 begins with a segment 171($r$) of digitized in-phase (i.e., real) data and a corresponding segment 171($i$) of quadrature (i.e., imaginary) data. The separation of in-phase and quadrature signals, as well as digitization, can be accomplished using any known process and apparatus. The size of segments 171($r$) and 171($i$) are arbitrary and may be as small as two lines, or as large as available processing technology and equipment permit.

Block 181($r$) comprising lines 1 and 2 of real data is selected from segment 171($r$). Block 181($i$) comprising lines 1 and 2 of imaginary data is selected in the manner described above from segment 171($i$). The captured blocks are transformed into the frequency domain by complex fast Fourier transform (FFT) 173. The output of FFT 173 is a frequency domain real signal $Y_r$ and a frequency domain imaginary signal $Y_i$. $Y_r$ and $Y_i$ are summed at 176. A complex multiplication is performed at 178 to multiply the inverse frequency response (determined earlier) $H^{-1}(f)$ by the combined $Y_r$ and $Y_i$ signals. For VSB signals, complex multiplication 178 also provides VSB filtering as described hereinbefore. For VSB signals, the imaginary portion is discarded and need not be processed further than complex multiplier 178.

The product of multiplication operation 178 is inverse transformed by IFFT 179 to produce a time domain signal comprising line 1 and line 2. Using the overlapped transform, the energy from long echoes contaminates the first portion and line 1 is therefore discarded. Line 2 is applied to a combiner circuit 180 where it is combined with line 1 from a previous cycle (not shown).

In FIG. 18, the process is repeated for a block selected to comprise lines 2 and 3. The like numbered processes perform the same functions as described in reference FIG. 17. The result of the processes shown in FIG. 18 is a time domain signal comprising line 2 and line 3 output from IFFT 179. In this cycle, line 2 is contaminated with the long echo energy, and is discarded. Line 3 is retained and combined with the retained line 2 from the cycle shown in FIG. 17. The processes shown in FIG. 17 and FIG. 18 are repeated for each block 181($i$) and 181($r$) of signal data.

It should be apparent that the present invention would work equally well by selecting four or six lines per block. Any even number of blocks will take advantage of the inherent guard interval of the NTSC signal in accordance with the present invention. Larger block sizes increase memory requirements and required more FFT processing power and increase delay. Merely increasing the scale of the blocks or lines is considered equivalent to the system and method described in the preferred embodiments.

Figure 19:
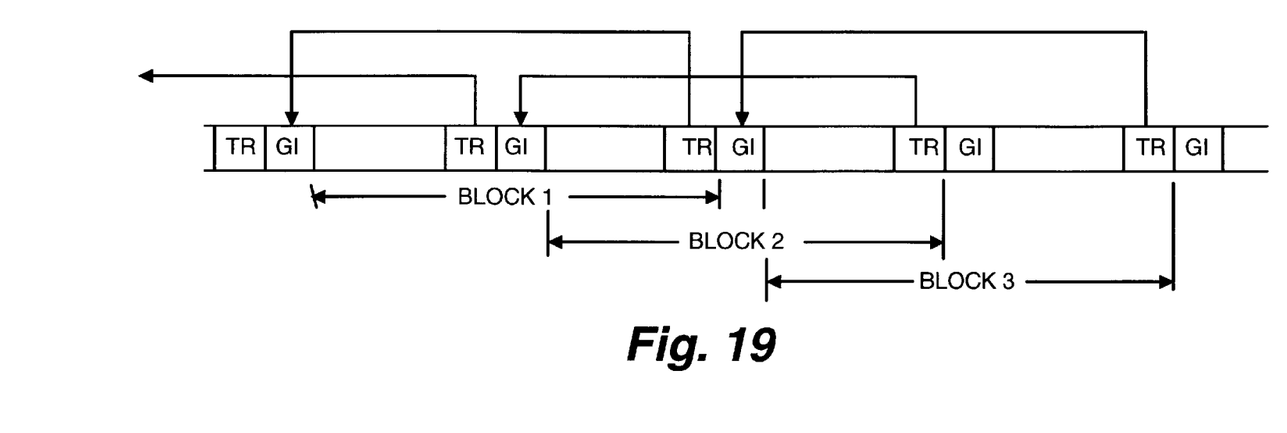
FIG. 19 shows a time domain diagram of a generic signal using guard intervals and overlapped transform techniques in accordance with an embodiment of the present invention.

FIG. 19 shows a time domain diagram of a generic signal illustrating how the present invention may be applied to other than an NTSC television signal. In the signal of FIG. 19, it is not required that the transmitted signal have an inherent guard interval that is present in the NTSC television signal shown in the previous examples. Before transmission, each block of data is constructed having a guard interval (indicated as GI in FIG. 19) and a "trailer" (indicated by TR in FIG. 19). The trailer is copied from the back end of each block and pasted to the guard interval at the beginning of each block. It is not necessary that adjacent blocks have identical trailers. Unlike the NTSC signal described hereinbefore, in FIG. 19 the trailer for Block 1 is not the same as the guard interval for Block 3. The guard interval may comprise any type of data, and there is no penalty for making the guard interval a blank line. By making the guard interval a blank line, transmitter power can be reduced. Alternatively, the guard interval can be a ghost-canceling reference (GCR) signal or a repeating GCR-inverse GCR combination. In general, the guard interval can be provided by any type of synchronization signal, GCR, or blank line that repeats on every line, every other line, or any number of lines in the transmitted signal.

Figure 20:
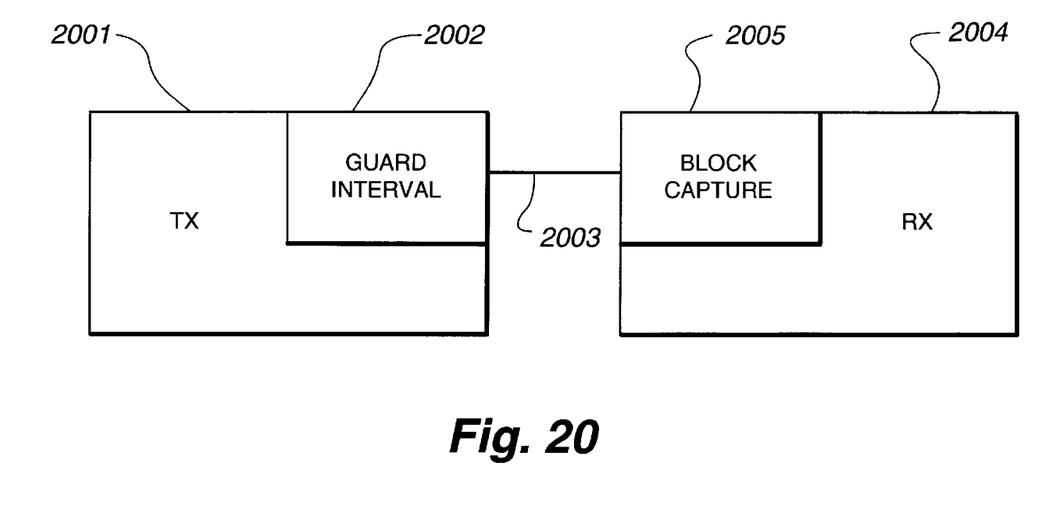
FIG. 20 shows in block diagram form a transmission system implementing the system and methods in accordance with the present invention.

FIG. 20 illustrates in block diagram form a general overview of a system incorporating the system and method in accordance with the present invention. Transmit unit 2001 comprises a system for generating a time domain signal for transmission. Examples include a television broadcasting station or a cable broadcasting station. Guard interval circuit 2002 comprises a circuit for augmenting the time domain signal with a guard interval as described hereinbefore. Guard interval circuitry is included in a broadcasting station generating an NTSC compliant signal and implemented as circuitry that generates the horizontal blanking interval portion of the NTSC compliant signal. Communication channel 2003 carries an RF time domain signal and couples transmit unit 2001 to an input of receive unit 2004. Receiver 2004 includes a block capture unit 2005 that sequentially captures time domain blocks of the received signal. In a particular example, block capture unit 2005 includes circuitry (not shown) to detect a horizontal blanking interval in a received television signal and synchronizing the beginning and ending of each captured block with the horizontal blanking interval. Any available technology and circuitry may be used to implement the block capture and blanking interval detection. Details of an exemplary implementation of receive unit 2004 are described in greater detail in reference to FIG. 17 and FIG. 18.

Although the invention has been described and illustrated with a certain degree of particularity, it is understood that the present disclosure has been made only by way of example. Numerous changes in the combination and arrangement of parts can be resorted to by those skilled in the art without departing from the spirit and scope of the invention, as hereinafter claimed. The present invention can be implemented as a dedicated signal processor or as a general purpose computer coupled to the data capturing receiver. The method in accordance with the present invention works well for both QAM digital signals and VSB digital signals. The frequency domain filtering may advantageously be used to perform root-cosine band filtering at the band edges.

We claim:

1. A method for signal demodulation comprising the steps of:
   providing a radio frequency (RF) time domain signal on a transmission channel, the RF signal comprising a band-limited data signal modulated on an RF carrier, the data signal comprising a plurality of transmission blocks of data;
   providing a time domain guard interval attached to each transmission block in the transmitted signal;
   demodulating the RF signal to baseband as an in-phase (I) data signal and a quadrature (Q) data signal;
   capturing a first block of I data;
   capturing a first block of Q data;
   performing a complex discrete Fourier transform on the captured first I and Q data blocks;
   determining an inverse channel response for the transmission channel;
   multiplying the inverse channel response by the complex discrete Fourier transform of the guard-interval protected first I and Q data blocks to generate a frequency domain product signal;
   performing an inverse Fourier transform on the product of the multiplying step to generate a first equalized time domain signal; and
   discarding a first portion of the first equalized time domain signal while retaining a second portion of the first equalized signal.

2. The method of claim 1 wherein the RF signal is a vestigial side band (VSB) signal and the method further comprises performing band filtering before performing the inverse Fourier transform.

3. The method of claim 1 wherein the method further comprises
   determining from an impulse response of the channel whether any echoes in the first block of I data and the first block of Q data are longer than the guard interval; and
   performing the step of discarding the first portion only when it is determined that at least one echo is longer than the guard interval.

4. The method of claim 1 further comprising the steps of digitizing the demodulated I and Q signals before performing the complex discrete Fourier transform.

5. The method of claim 1 wherein the step of providing a guard interval comprises:
   copying a portion of the data signal from the back of each of the transmission blocks; and
   appending the copied portion in front of each of the transmission blocks.

6. The method of claim 5 wherein the copied portion comprises data from a time duration longer than a duration of an expected echo.

7. The method of claim 1 wherein the step of providing a guard interval comprises:
   periodically including a substantially identical portion of data in the time domain data signal; and
   selecting the first blocks of I and Q data such that the first blocks begin just after the occurrence of one of the substantially identical portions and the first blocks end just after a subsequent occurrence of the substantially identical portion.

8. The method of claim 7 wherein the RF signal comprises an NTSC signal and the substantially identical portions comprise horizontal blanking intervals.

9. The method of claim 1 wherein the captured first blocks correspond to two sequential lines of an NTSC signal and the step of providing a time domain guard interval comprises selecting the first blocks such that the first blocks begin immediately a horizontal sync interval of the first line and the first blocks end immediately after a horizontal sync interval of the second line.

10. The method of claim 1 further comprising the steps of:
   capturing a second block of I data, wherein the second block of I data overlaps the first block of I data in a time interval corresponding to the retained portion of the first equalized signal;
   capturing a second block of Q data, wherein the second block of Q data overlaps the first block of Q data in a time interval corresponding to the retained portion of the first equalized signal;
   providing a time domain guard interval in the captured second blocks of I and Q data;
   performing a complex discrete Fourier transform on the captured second I and Q data blocks;
   multiplying the inverse frequency response by the complex discrete Fourier transform of the guard-interval protected second I and Q data blocks to generate a frequency domain product signal;
   performing an inverse Fourier transform on the product of the multiplying step to generate a second equalized time domain signal;
   discarding a first portion of the second equalized time domain signal while retaining a second portion of the second equalized signal, wherein the first portion of the second equalized signal corresponds to the time domain data in the second portion of the first equalized signal; and
   combining the retained portion of the first equalized signal with the retained portion of the second equalized signal to form a composite equalized signal.

11. A method for demodulating a signal transmitted over a channel comprising the steps of:

determining an inverse frequency response of the channel;

digitizing the transmitted signal;

dividing the transmitted signal into a plurality of discrete blocks, wherein each of the blocks overlaps two adjacent blocks and each portion of the transmitted signal appears in two adjacent blocks;

transforming each block using a Fourier transform;

multiplying each transformed block by the inverse frequency response to generate a frequency domain product signal; and performing an inverse Fourier transform on the frequency domain product signal to generate an equalized time domain signal;

discarding the first portion of the equalized time domain signal for each of the blocks; and combining the retained portion of each of the blocks to form a composite time domain filtered, signal.

12. The method of claim 11 further comprising a step of adding a time domain guard interval to each of the discrete blocks.

13. The method of claim 11 wherein the transmitted signal is an NTSC signal and each block is two lines long and is selected to begin just after a horizontal blanking interval and to end just after a horizontal blanking interval.

14. A system for transmission of a signal comprising:

a communication channel;

a transmitter transmitting a time domain signal on the communication channel;

a receiver receiving the signal after it has passed through and been distorted by the communication channel;

means in the receiver for determining an inverse frequency response of the channel;

a capture circuit for capturing overlapping time domain blocks of the received signal;

a transform circuit performing a transformation process on each of the captured time domain blocks so as to transform each time domain block to a frequency domain block;

a multiplier circuit coupled to multiply each frequency domain block by the inverse frequency response to generate a filtered frequency domain block;

an inverse transform circuit performing an inverse transformation process on each of the filtered frequency domain blocks so as to transform each filtered frequency domain block into a filtered time domain block;

a selector coupled to discard a first portion of each filtered time domain block and retain a second portion of each time domain block; and a combining circuit coupled to combine the retained portions of each of the filtered time domain blocks.

15. The system of claim 14 further comprising:

a guard interval circuit for adding a time domain guard interval to each of the overlapping time domain blocks.

16. The system of claim 15 wherein the guard interval circuit is located in the transmitter and adds a substantially identical signal portion to the time domain signal and the capture circuit further comprises means for selecting each of the overlapping time domain blocks based upon the location of the substantially identical signal portion.

17. A demodulating apparatus for a television signal comprising:

an input for receiving a television signal from a communication channel;

a block capture circuit coupled to sequentially capture overlapping time domain blocks of the received television signal such that each of the captured blocks includes a time domain guard interval;

a Fourier transform circuit receiving each of the overlapping blocks and outputting a frequency domain block for each of the overlapping time domain blocks;

an adaptive equalizer coupled to receive the frequency domain blocks from the Fourier transform circuit and output an equalized frequency domain block for each received frequency domain block;

an inverse Fourier transform circuit coupled to the output of the adaptive equalizer and generating a filtered time domain block for each of the equalized frequency domain blocks; and a selector for discarding a first portion of each of the filtered time domain blocks and combining a remainder portion of each of the filtered time domain blocks into a ghost canceled demodulated signal.

18. The apparatus of claim 17 wherein the block capture circuit further comprises a detector for detecting a horizontal blanking interval in the received television signal and synchronizing the beginning and ending of each captured block with the horizontal blanking interval.

* * * * *